Patented Feb. 6, 1951

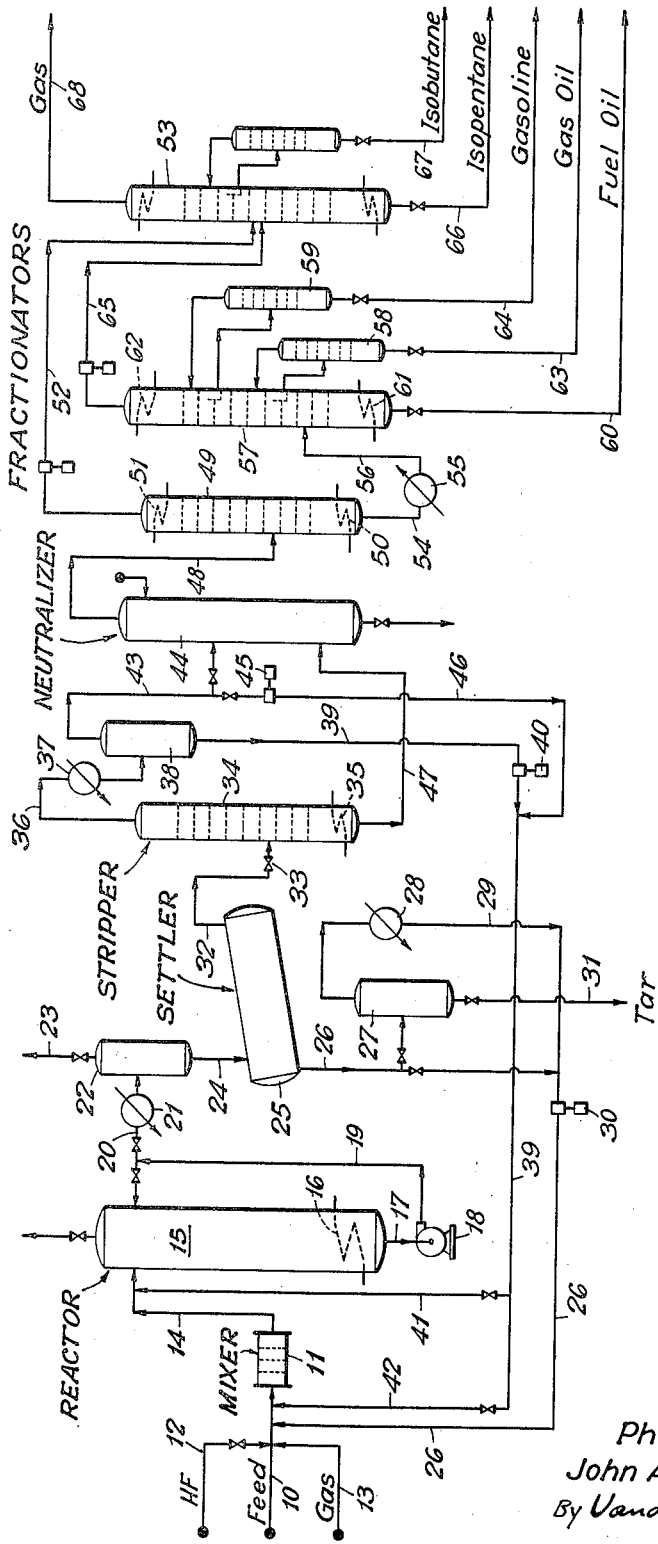

2,540,379

UNITED STATES PATENT OFFICE 2,540,379

CRACKING WITH HYDROFLUORIC ACID CATALYST

John A. Ridgway, Jr., Texas City, Tex., and Philip Hill, Hammond, Ind., assignors to Pan American Refining Corporation, Texas City, Tex., a corporation of Delaware Application December 27, 1946, Serial No. 718,816

10 Claims. (Cl. 196—52)

This invention relates to the cracking of hydrocarbon oils and more particularly it relates to the use of liquid hydrofluoric acid as a catalyst in cracking heavy oil such as gas oil and petroleum residues. Still more particularly the invention relates to cracking of petroleum gas oil into gasoline, gas and tar in the presence of substantial amounts of hydrofluoric acid in liquid phase. One object of the invention is to convert heavy hydrocarbons such as gas oil, into gasoline in the presence of a catalyst, substantially without the formation of carbon or carbonaceous compounds of such a character as to absorb or destroy the catalyst. Another object of the invention is to provide a process for cracking heavy hydrocarbon oils with a minimum production of dry gas. Still another object of the invention is to provide a hydrocarbon cracking process which selectively converts a major part of the oil to gasoline and a tar suitable for heavy fuel oil with a high heating value while producing a minor amount of gases such as hydrogen, methane, ethane and propane. Other objects of the invention will become apparent from the description which follows.

This application is a continuation-in-part of our U. S. Patent No. 2,454,615 filed November 12, 1943. It relates more specifically to the utilization of hydrocarbon gases in the conversion reaction, generally by recycling.

The invention is illustrated by a drawing which shows diagrammatically an apparatus for carrying out the process.

Heretofore the catalytic cracking of heavy oils has been beset by the great difficulty of catalyst deterioration, some processes requiring high catalyst replacement and others requiring frequent catalyst regeneration at considerable expense. In the case of metal halide catalysts such as aluminum chloride employed in the well-known McAfee process, the aluminum chloride suffered rapid contamination resulting in extensive aluminum chloride losses owning to catalyst degeneration. The cause of degeneration is generally traceable to the interaction of the heavy hydrocarbons and their breakdown products with the aluminum chloride, forming more or less stable addition products or a sludge of no catalytic value. Many attempts have been made to regenerate the aluminum chloride but without much commercial success.

In the case of high temperature catalytic cracking processes employing refractory porous solid catalysts such as the active metal oxides, silica, alumina, magnesia, titania, zirconia and mixtures thereof, catalyst deactivation is very rapid and regeneration is required frequently, e. g. after a few minutes to a few hours. This regeneration is usually accomplished in the case of refractory metal oxide catalysts by combustion with air or other oxidizing gas. In the regeneration operation, considerable quantities of carbonaceous matter accumulated on the catalyst by breakdown of the oil are removed in the oxidation.

When substantially anhydrous liquid hydrofluoric acid is employed as a cracking catalyst in substantial amounts at moderately elevated temperatures, the conversion can be carried out with substantially no carbon formation but with the formation of considerable tar and heavy fuel, i. e. high boiling conversion products. On distillation of the conversion residue, the hydrofluoric acid catalyst, having formed no permanent compounds therewith, can be recovered from the tar substantially completely for reuse in the process. The heavy conversion products produced by the action of this catalyst are valuable fuel oils after removal of HF therefrom. One of their characteristics is their high heat of combustion coupled with low specific gravity, making them very suitable for fuel purposes.

The following examples illustrate the conversion of gas oil with liquid HF catalyst in a batch operation. Virgin gas oil and recycle gas oil from hydrofluoric acid cracking having the following characteristics were employed.

|  | Virgin Gas Oil | Recycle Gas Oil |
|---|---|---|
| Specific Gravity | 0.83 | 0.81 |
| Aniline Point, °F | 170 | 179 |
| Distillation, ASTM, °F.: | | |
| 10% | 454 | 462 |
| 30% | 482 | 505 |
| 50% | 515 | 533 |
| 70% | 537 | 560 |
| 90% | 575 | 608 |
| Volumetric Average Boiling Point, °F | 513 | 534 |

The reaction was carried out in a bomb under the conditions set forth as follows:

| Charge | Virgin Gas Oil | | Recycle Gas Oil |
|---|---|---|---|
| Run Number | 1 | 2 | 3 |
| Per Cent Cat. by Wt | 295 | 193 | 191 |
| Per Cent Cat. by Vol | 234 | 158 | 158 |
| Per Cent Cat. by Mols | 3200 | 2160 | 2280 |
| Time, hours | 4 | 4 | 4 |
| Temperature, °C | 155–165 | 155–162 | 155–161 |
| Max. pressure, lbs./sq. in | 910 | 840 | About 850 |
| Product, Wt. Per Cent of Charge: | | | |
| Gas— | | | |
| $C_1$ | 0.22 | 0.08 | 0.49 |
| $C_2$ | | | 0.46 |
| $C_3$ | 4.05 | 2.47 | 3.39 |
| $iC_4$ | 20.3 | 14.20 | 10.88 |
| $nC_4$ | 2.13 | 1.11 | 1.23 |
| $iC_5$ | 7.27 | 6.20 | 5.10 |
| $nC_5$ | 1.16 | 0.60 | 1.52 |
| Total Gas | 35.1 | 24.6 | 23.1 |
| Liquid Distillate— | | | |
| $C_6$–100° C | 6.0 | 3.9 | |
| 100–200° C | 4.7 | 8.7 | 39.9 |
| 200+ °C | 9.0 | 20.7 | |
| Total Gasoline | 10.7 | 12.6 | |
| Total Recycle Stock | 9.0 | 20.7 | |
| Total Reacting | 91.0 | 79.3 | |
| Tar | 45.2 | 42.1 | 37.0 |

| Yield Data (Based on amount reacting) | Virgin Gas Oil | |
|---|---|---|
| Run Number | 1 | 2 |
| | Per cent | Per cent |
| Total gas ($C_5$, $C_4$, $C_3$ and lighter) | 38.6 | 31.0 |
| Gasoline ($C_6$–200° C.) | 11.7 | 15.9 |
| Gas+gasoline | 50.3 | 46.9 |
| Tar | 49.7 | 53.1 |

These data show that the proportion of catalyst employed in the conversion is of considerable importance in determining the extent of conversion obtained. Thus the total amount of conversion (total reacting) in run 1 with 295% of HF was 91% compared with only 79.3% in run 2 in which all the conditions were the same except the proportion of catalyst was 193% by weight instead of 295%. In general, it is desirable to employ an amount of catalyst equal to at least half the weight of the oil treated, and a catalyst-oil weight ratio in the range of 1:1 to 3:1 is desirable.

Inspection of the above results also shows that the increased proportion of catalyst employed in run 1 favors the production of isobutane, a valuable product useful in alkylation and other reactions. By recycling the excess isobutane produced or by charging it to another reaction with gas oil, it can be largely converted to gasoline. Although the recovery of tar in run 1 appears to be slightly larger than in run 2, this increase is only apparent. When correction is made for the increased conversion in run 1 (91.0 v. 79.3) the tar yield will be seen to be less with increased proportion of catalyst to oil. (Note yield based on percent reacting 49.7 v. 53.1.) The temperature employed with liquid HF cracking catalyst is unusually low for catalytic conversion reactions, the range in temperature usually being about 100 to 230° C. and preferably about 140 to 175° C.

The reaction time may be varied over a considerable range depending primarily on the temperature and the ratio of catalyst to oil treated. Thus, in an example in which 193% of HF was used to convert virgin gas oil, the total gas yield obtained from virgin gas oil at 135 to 145° C. was only 2.4% at a reaction time of two hours and 7% at five hours reaction time. However, in another example with the same catalyst concentration but with a conversion temperature of 155 to 160° C. an increase in reaction time of from 1½ to four hours increased the gas yield from 3.4 to 24.6 per cent. In general it appears that a conversion temperature of 150° C. or above is necessary for appreciable gas production within a period of four hours or less.

The apparent low yield of "gasoline" in the above runs must be corrected by adding thereto the $C_5$ and most of the $C_4$ hydrocarbons when comparing with the usual conversion data on gasoline of 9 to 12 pounds Reid vapor pressure. On this basis the gasoline yield in run 2 would be about 44% based on amount reacting.

These gasoline yields can be greatly increased by reducing the time of contact with the catalyst and by introducing hydrocarbon gases into the conversion operation.

In another example, a virgin gas oil of 36.9° A. P. I. gravity was subjected to the action of liquid HF under the following conditions, the catalyst phase being separated from the product and recycled during the operation.

*Conditions*

| | |
|---|---|
| Average reactor temperature, °F. | 325 |
| Reactor pressure, p. s. i. g. | 900 |
| Charge rate: lbs. gas oil/hr./ cu. ft. of reactor vol. | 29.4 |
| Relative wt. velocity: lbs. oil/hr./lb. HF | 1.1 |
| Contact time, minutes | 13.4 |
| HF catalyst-oil ratio | 4.2 |

| Yields | Vol. Per cent | Wt. Per cent |
|---|---|---|
| Dry Gas ($C_3$ and Lighter) | 1.80 | 0.80 |
| Excess Isobutane | 3.80 | 2.54 |
| Gasoline (400° E. P. 10.4 RVP) | 38.30 | 33.00 |
| Gas Oil | 46.80 | 46.50 |
| Tar | 12.90 | 17.16 |

*Octane ratings on gasoline—ASTM*

| | Motor Method | Research Method |
|---|---|---|
| ASTM Motor Method: | | |
| Clear | 69.1 | 70.6 |
| 1 cc. per gal. tetraethyl lead added | 79.9 | |

An analysis of the gases showed that the $C_4$ fraction contained no butylenes and only about 10% of normal butane, the remainder being isobutane.

Referring to the drawing, a suitable feed stock, for example a virgin gas oil of 35° A. P. I. gravity having a boiling range of about 345° to 650° F. is charged to the system by line 10 leading to mixer 11. Any suitable mixing device can be used such as an orifice mixer which consists of a series of orifice plates thru which feed stock is forced to flow at high velocity. Liquid HF is charged to the system by line 12 and mixed with the hydrocarbon feed in mixer 11. Isobutane or other suitable hydrocarbon gas, such as propane, propylene, normal butane or pentane but preferably a $C_3$ or $C_4$ paraffin or olefin, is introduced by line 13. The mixture of heavy oil, liquid HF, and gas then flows from mixer 11 by line 14 to reaction chamber 15. The volume of the reaction chamber is sufficient to provide the desired reaction time, for example ten minutes to four hours depending on the temperature, character of the feed stock, etc. At higher temperatures somewhat shorter times may be employed, for example two to ten minutes. For operations at short contact times, a coil reactor may be used.

The amount of HF employed in the reaction is sufficient to maintain a separate liquid phase and it is desirable to employ a considerable excess above that required to saturate the hydrocarbons. It is preferred to use sufficient pressure to maintain the reaction mixture in liquid phase including the gas which dissolves in the hydrocarbon oil charging stock and the liquid HF under pressure. The pressure is usually above 500 pounds and within the range of 500 to 2000 pounds, about 1000 p. s. i. being suitable for use with a gas such as isobutane. With lighter gases it may be desirable to operate at pressures as high as 3000 p. s. i.

The temperature of the reaction zone 15 is maintained above 100° C. and generally within the range of 125° to 200° C., a suitable temperature being about 150 to 160° C. Higher temperatures may be employed for short reaction periods. A suitable heating means may be employed for the purpose, for example, coil 16 supplied with heated oil, steam or other heating fluid may be used. We can also preheat the HF and feed stocks in separate heaters, not shown, previous to mixing in mixer 11.

The mixture of hydrocarbon stock and HF in reactor 15 is maintained in a highly agitated condition in order to obtain the necessary contacts between the two liquid phases to effect catalytic conversion. Mechanical agitators may be installed directly in the reaction chamber or the agitation may be provided both internally and externally of the reaction chamber as shown in the drawing. According to this method, the reaction mixture is withdrawn by line 17 from the bottom of chamber 15 and conducted by centrifugal pump 18 thru line 19 back to the top of the reaction chamber. By maintaining a high recycle ratio, any desired degree of interspersion of the liquid catalyst phase and the oil may be obtained.

A controlled stream of reaction products is withdrawn by valved line 20 leading thru cooler 21 to gas separator 22 from which some of the lighter gaseous reaction products such as methane can be withdrawn by line 23. These gaseous products saturated with HF can be recycled to the reactor 15, if desired, by means not shown, and excessive amounts of fixed gases, particularly methane, can be eliminated before recycling.

Liquid reaction products are conducted by line 24 to catalyst settler and separator 25. Settler 25 is preferably a substantially horizontal, cylindrical, elongated chamber thru which the reaction products flow continuously without agitation, thereby allowing the heavier liquid HF and associated tar to separate at the bottom of the settler. This catalyst layer containing heavy hydrocarbons in solution can be conducted directly by line 26 back to the feed mixer 11 wherein it is mixed with correct amounts of hydrocarbon feed stock and returned to the reactor 15. Or a part or all of this stream may be diverted thru tar separator 27 wherein HF is distilled from the tar, the HF being condensed in condenser 28 and recycled by line 29 and pump 30 to the mixer 11, or if desired directly to reactor 15 while tar is withdrawn by line 31. The ratio of tar withdrawn by line 31 to that which is recycled directly by line 26 is controlled to maintain the optimum concentration of HF and tar in reactor 15, as it has been found that when the HF in the reactor contains about 15 to 35 per cent of dissolved hydrocarbons, its cracking activity is considerably enhanced. Likewise the conversion of gaseous hydrocarbons such as isobutane to liquid hydrocarbons is increased by maintaining a substantial concentration of HF-soluble hydrocarbons in the catalyst phase in reactor 15.

Most of the hydrocarbon reaction products are withdrawn from settler 25 by line 32 and valve 33 where the pressure is reduced before transferring into stripping tower 34 heated by coil 35. It is desirable to operate tower 34 as a depropanizer and/or debutanizer. Hydrocarbon gases dissolved in the reaction products including propane and part or all of the isobutane are withdrawn by line 36 leading to condenser 37 and receiver 38, whence these hydrocarbons together with most of the HF stripped out of the liquid hydrocarbon products in stripper 34 are conducted by line 39 and pump 40 back to reactor 15 by line 41 or to mixer 11 by line 42. Any uncondensed gases in 38 are conducted by line 43 to neutralizer 44 or they may be compressed in 45 and conducted back to reactor 15 by line 46 as indicated.

The liquid hydrocarbon products substantially free of HF are conducted from the bottom of stripper 34 by line 47 leading to neutralizer 44 where they are absorbed in a suitable alkaline neutralizing agent such as sodium carbonate, sodium hydroxide, lime, etc., either solid or in solution, or by adsorption with a suitable adsorber for HF such as fuller's earth, silica gel, bauxite or one of the acid-adsorbing, nitrogen-base resins employed in water treating.

From neutralizer 44, reaction products pass by line 48 to fractionator 49. Heat is supplied to the fractionator by reboiler coil 50 and reflux by cooling coil 51. Light products comprised mainly of $C_5$ hydrocarbons with remaining $C_4$ hydrocarbons not removed in stripper 34 are distilled off thru line 52 leading to fractionator 53.

The principal liquid products are withdrawn from the bottom of fractionator 49 by line 54 and heated in heater 55 which may be a pipe still for example. From heater 55 the liquid products are conducted by line 56 to fractionator 57 provided with gas oil and gasoline side strippers 58 and 59 respectively. A heavy fraction suitable for fuel oil or asphalt manufacture is withdrawn at the bottom by line 60. Heat required for reboiling in fractionator 57 is supplied by coil 61 while reflux cooling is supplied by coil 62. The gas oil fraction withdrawn by line 63 may be conducted back to mixer 11 as feed stock for the process. The gasoline withdrawn by line 64 is essentially a heavy blending naphtha.

The remaining $C_5$ hydrocarbons in 57 are withdrawn as a vapor by line 65 and charged to fractionator 53 where they are separated with the overhead from fractionator 49, the $C_5$ fraction being withdrawn at the bottom by line 66 and the $C_4$'s as a side stream by line 67. Any uncondensed gases are taken overhead by line 68. The pentane and butane streams produced in the process consist largely of isopentane and isobutane. The isopentane is chiefly valuable for blending in aviation fuels and other high knock rating gasoline stocks. Both isopentane and isobutane may be subjected to alkylation with suitable olefins, for example ethylene, propylene or butylene, to produce alkylate gasoline, neohexane, isooctane, triptane, etc., very desirable constituents of aviation fuel.

In the cracking of virgin gas oil, gas production has been found to decrease with increasing reaction pressure. When the reaction pressure is increased from 1290 to 2100 pounds per square inch gage, a sharp decrease in total gas yield and tar formation is noted with increased production of recycle stock, while the gasoline yield remains essentially constant, indicating that at higher pressures and correspondingly higher concentrations of hydrocarbon gases in the catalyst phase a chemical reaction occurs between the gases and the heavy hydrocarbon constituents of the catalyst phase herein referred to generally as tar. This interaction may involve a simultaneous cracking and alkylation of these heavy hydrocarbons with the production of lighter saturated products. Data on the yields of gas, gasoline and tar compared with percent of stock cracked show that the rate of tar production increases regularly with the extent of cracking while the gasoline reaches a maximum with conditions producing a total conversion of about 65 percent.

The following example shows the effect of isobutane on the HF cracking of East Texas gas oil under batch conditions. Two runs were made under the same conditions except that in run 2 an equal volume of isobutane was charged with the gas oil. After the conversion reaction the products were cooled and an HF-tar layer was separated, decomposed with water, and the tar fraction obtained therefrom. The remaining products, gasoline and recycled gas oil, were obtained from the HF insoluble fraction from the upper layer.

*Reaction conditions*

|  | Run #1 | Run #2 |
|---|---|---|
| Feed: |  |  |
| Gas Oil | One Volume | One Volume. |
| Isobutane |  | Do. |
| Liquid HF Catalyst | Two Volumes | Two Volumes. |
| Temperature | 330° F | 330° F. |
| Reaction Time | 30 Minutes | 30 Minutes. |

*Products*

|  | Run #1 | Run #2 |
|---|---|---|
|  | Wt. per cent | Wt. per cent |
| Gas (Largely Isobutane) | 5.9 | ¹0.5 |
| Gasoline (10 R. V. P.) | 20.9 | 27.2 |
| Gas Oil | 43.8 | 53.5 |
| Tar | 29.4 | 18.8 |
|  | 100.0 | 100.0 |

¹ Corrected for added isobutane.

The tar from run 1 had a specific gravity of 1.004 and that from run 2 a specific gravity of 0.981, indicating that the presence of the isobutane in the reaction serves to reduce the amount of polymerization or has a "depolyalkylating" effect on the tar fraction in the presence of the HF catalyst. This together with the lower amount of tar produced in run 2 undoubtedly accounts largely for the increased gasoline production.

As indicated hereinabove, one of the important advantages of this process of hydrocarbon conversion over other catalytic processes lies in the substantially complete recovery of catalyst without necessity of regeneration. Most of the catalyst separates as a separate liquid layer while the remainder is removed by simply stripping or distilling the catalyst from the reaction products. Substantially no undecomposable sludge or catalyst complex is formed in the reaction and therefore very little fresh catalyst need be added by way of replacement beyond that necessary to compensate for mechanical losses.

The conversion action of liquid hydrofluoric acid may be modified if desired by adding small amounts of certain other reagents or promoters; for example, by adding $BF_3$ the product distribution may be substantially altered. Amounts used are generally only about 1 to 10 per cent. When using such promoters it is desirable to either recover the promoter along with the HF or if the promoter is discarded it is desirable to recover the HF therefrom, for example, by distillation. In the case of $BF_3$, it may be recovered from the gaseous hydrocarbon reaction products by means not shown in the drawing.

Hydrogen may also be employed in the HF conversion reaction to modify the character and amount of tar or asphalt formed. In the HF catalytic cracking process, the gas produced consists chiefly of butanes and pentanes and in most cases these fractions contain about 88 to 93 per cent of isoparaffins. No neopentane has been detected. The butane yields are especially high; for example 22.4 per cent from virgin gas oil, and 28.7 per cent from dodecene was obtained. These gases may be recycled to the HF conversion reaction as indicated. The heavier charging stocks tend to produce less dry gas, that is, propane and lighter hydrocarbons and hydrogen, than the lighter charging stocks. All the gas is substantially saturated. If desired, the $C_4$ and $C_5$ fraction may be allowed to remain with the gasoline instead of being separated as shown hereinabove. It is generally preferred to operate the process with sufficient cracking to yield products having a 90% point—ASTM—below the 10% point of the charging stock.

The concentration of isobutane and isopentane produced in the HF cracking reaction is much higher than would be expected from the equilibrium values calculated from thermodynamic data for the isomerization of $C_4$ and $C_5$ hydrocarbons, which may indicate that isomerization occurs prior to or simultaneously with the cracking reaction in the presence of HF. For comparison, the concentration of isobutane in the catalytic isomerization of normal butanes is only about 65%.

The gasoline obtained in the process is substantially free of unsaturation and a cut from hexane to 200° C. had a knock rating of 57 by the ASTM method which was determined in a 20% blend with reference fuel. Inclusion of isobutane and isopentane produced in the process would of course increase the knock rating very considerably, and it is estimated that a gasoline fraction containing sufficient of the lighter hydrocarbons to give a vapor pressure of 10 pounds R. V. P. will have a knock rating of 67.5, ASTM. However, because of the high concentration of isopentane (about 90%) in the $C_5$ fraction, it is usually more desirable to use this stock in aviation fuel blending where isopentane commands a high premium.

The tar produced in the process is characterized by high specific gravity, for example about 1 or above. It can be employed as a heavy fuel or converted into asphalt by heating and/or blowing with air.

Although we have described our process as it is applied to the conversion of gas oil, it may also be applied to low knock rating heavy napthas boiling, for example, in the range at 325° to 450° F., where it is desired to obtain $C_4$ and $C_5$ hydrocarbons for special purposes.

We claim:

1. The process of making gasoline by cracking heavy hydrocarbon oils having substantially the characteristics of gas oil which comprises subjecting said oil to the action of a catalyst consisting essentially of liquid hydrofluoric acid in an amount of at least one part of catalyst by weight to two parts of oil, thoroughly agitating the mixture of catalyst and oil in a reaction zone under sufficient pressure to maintain said catalyst in liquid phase, maintaining the temperature of said reaction zone within the range of about 100 to 250° C., continuing the reaction until said gas oil is substantially converted into lighter hydrocarbon products including gaseous isoparaffin hydrocarbons, withdrawing the reaction products from said reaction zone, separating the reaction products from hydrofluoric acid, recovering gasoline, an isoparaffin gas fraction and tar therefrom, a recycling hydrofluoric acid and said isoparaffin gas fraction to said reaction zone.

2. The process of claim 1 wherein the gas fraction recycled is largely isobutane.

3. The process of making gasoline by cracking heavy hydrocarbon oils which comprises subjecting them at elevated temperature of at least 100° C. to the action of at least 50 per cent by weight of a catalyst consisting essentially of liquid HF under superatmospheric pressure, maintaining sufficient pressure to keep the HF in liquid phase, injecting into said reaction zone an isoparaffin hydrocarbon gas, maintaining sufficient pressure to keep the HF in liquid phase, regulating the temperature and time of treating to effect substantial cracking of said heavy oils to lighter hydrocarbon products, separating the HF from the reaction products, recycling the separated HF to the cracking operation, and separating gasoline from the hydrocarbon reaction products.

4. The process of claim 3 wherein the hydrocarbon gas is largely isobutane.

5. The process of making gasoline by cracking heavy hydrocarbon oils boiling above the gasoline boiling range to produce lighter isoparaffinic hydrocarbons which comprises contacting said oil with at least 50 per cent by weight of a catalyst consisting essentially of anyhydrous liquid hydrofluoric acid at a temperature in the range of about 125 to 250° C., introducing an isoparaffin hydrocarbon gas into the reaction zone in an amount of about 1000 to 3000 cubic feet per barrel of heavy oil treated, maintaining sufficient pressure on said reaction zone to keep the catalyst in the liquid phase, continuing the reaction until said heavy hydrocarbon oil is substantially converted into hydrocarbons boiling in the gasoline boiling range, recovering catalyst from the reaction products and returning it to said reaction zone, and separating from the reaction products tar, gasoline and hydrocarbon gas.

6. In the process of converting heavy hydrocarbon oils into gasoline by the action of a catalyst consisting essentially of HF, wherein said oil is contacted with said catalyst at a temperature of at least 100° C. and under pressure of at least 500 p. s. i. in a reaction zone for sufficient time to convert said heavy oil substantially into gasoline and tar and said tar forms within said reaction zone a solution with said HF, the improvement comprising injecting into said HF-tar solution within said reaction zone an isoparaffin hydrocarbon gas whereby the amount of tar formed in said conversion reaction is substantially diminished by the action of said gas with the formation of an increased proportion of gasoline, thereafter recovering gasoline from the products of said reaction and recycling HF and gas to said reaction zone.

7. The process of claim 6 wherein a substantial part of the tar separated from said reaction products is recycled with HF to said reaction zone for further conversion therein.

8. The process of converting a heavy hydrocarbon oil into gasoline which comprises contacting said oil with a catalyst consisting essentially of HF and an isoparaffin hydrocarbon gas selected from the class consisting of isobutane and isopentane in a reaction zone maintained under sufficient pressure to keep HF in liquid phase, maintaining the temperature within said reaction zone above about 125° C., withdrawing and cooling reaction products from said reaction zone, separating the cooled liquid reaction products into a hydrocarbon phase and a catalyst phase, recycling the catalyst phase to the reaction zone, stripping hydrocarbon gas comprised of isoparaffins from the hydrocarbon phase and recycling it to the reaction zone, and distilling the remaining liquid hydrocarbon products to produce the desired gasoline fraction.

9. The process of claim 8 wherein a part of the HF catalyst phase separated from the reaction products is stripped of HF and the hydrocarbon portion is discarded from the system as tar.

10. The process of claim 8 wherein an isobutane fraction is separated from the hydrocarbon gases and recycled to the reaction zone while hydrocarbon gases lighter than isobutane are discarded from the system.

JOHN A. RIDGWAY, Jr.
PHILIP HILL.

REFERENCES CITED

The following references are of record in the file of this patent:

UNITED STATES PATENTS

| Number | Name | Date |
| --- | --- | --- |
| 2,266,012 | O'Ouville et al. | Dec. 16, 1941 |
| 2,343,841 | Burk | Mar. 7, 1944 |
| 2,357,495 | Bloch | Sept. 5, 1944 |
| 2,378,762 | Frey | June 19, 1945 |
| 2,405,995 | Burk | Aug. 20, 1946 |
| 2,416,184 | Lee et al. | Feb. 18, 1947 |
| 2,449,469 | Evering et al. | Sept. 14, 1948 |
| 2,454,615 | Ridgway et al. | Nov. 23, 1948 |